April 22, 1924.
W. J. MORGAN
DIRIGIBLE HEADLIGHT
Filed Feb. 2, 1923
1,491,488
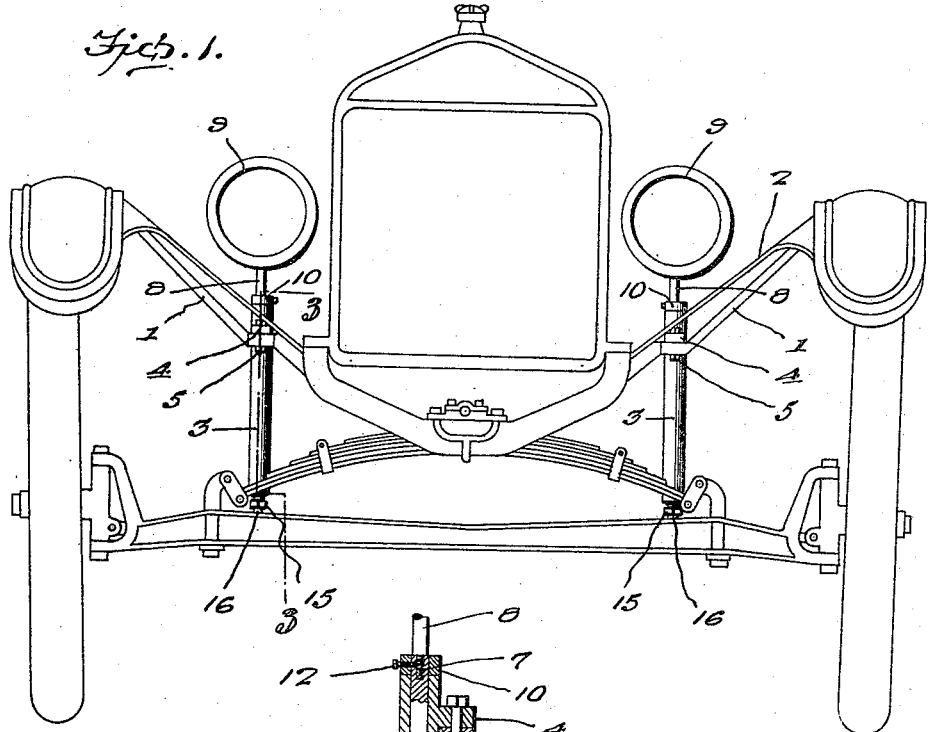
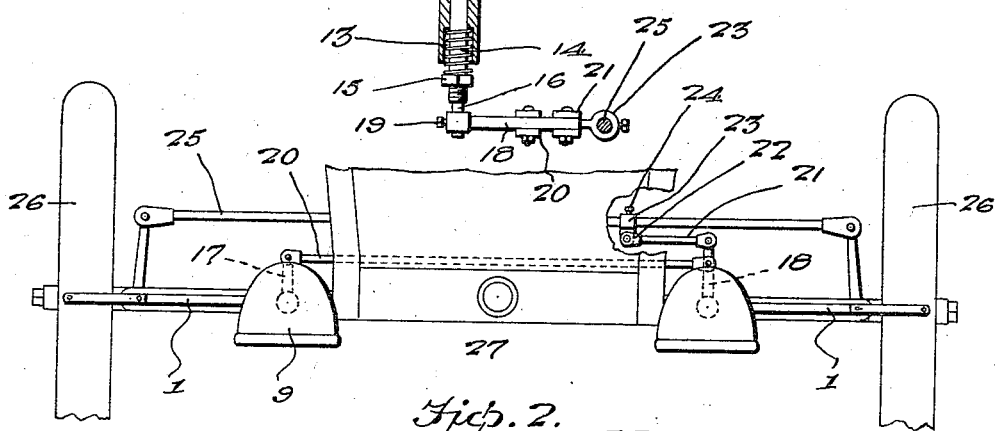

Patented Apr. 22, 1924.

1,491,488

UNITED STATES PATENT OFFICE.

WILLIAM J. MORGAN, OF ENHAUT, PENNSYLVANIA.

DIRIGIBLE HEADLIGHT.

Application filed February 2, 1923. Serial No. 616,523.

*To all whom it may concern:*

Be it known that I, WILLIAM J. MORGAN, a citizen of the United States, residing at Enhaut, in the county of Dauphin and State of Pennsylvania, have invented new and useful Improvements in Dirigible Headlights, of which the following is a specification.

The object of this invention is to produce a simple, cheap and effective means for causing the headlamps of an automobile to turn with and in the same direction as the turning of the front wheels of the machine so that rays of light will be directed toward the front of the automobile regardless of the angles or turns which the machine makes.

A further object is to produce a headlamp turning means in which the headlamps ordinarily employed upon a certain well-known small type of automobiles may be employed and mounted in such a manner as to turn with the turning of the steering wheels, said mounting not interfering with the usual arrangement of parts in such machines.

To the attainment of the foregoing and other objects which will present themselves as the nature of the invention is better understood, reference is to be had to the drawing which accompanies and which forms part of this application.

In the drawing:—

Figure 1 is a front elevation of an automobile provided with the improvement.

Figure 2 is a fragmentary top plan view thereof.

Figure 3 is a sectional view approximately on the line 3—3 of Figure 1.

In carrying out my invention I remove the headlamps from the supports therefor. In a well-known small type of automobiles the headlamps are supported from braces which also support the front wheel fenders, and in the drawing these braces are indicated by the numeral 1. I pass through openings in the mud guards or fenders 2, in a line with one of the sides of the braces 1, tubular sleeves 3. Each sleeve 3 is provided with a lug 4 that is received between the lugs on the brace 1 that normally contact with the base of the headlamp posts. Securing means 5 pass through openings in the lugs and through the openings in the brace 1. Through each of the sleeves 3 there is passed a cross sectionally round rod 6, the upper end of the rod projecting through the sleeve and having a threaded bore to receive therein the threaded end 7 of the post 8 for the headlamp 9. Surrounding the projecting end of the rod 6, and resting on the upper end of each of the sleeves 3 there is a collar 10, a threaded binding element 12 passing through threaded openings in the collar 10 and sleeve to contact with the threaded reduced end 7 of the post 8.

The bore of each of the sleeves 3, at the lower end of said sleeves is widened, as at 13, and in this widened portion, and of course, surrounding the rod 6, there is a helical spring 14. The lower end of each of the rods 6 is threaded and has screwed thereon a nut 15 against which the outer convolution of the spring 14 contacts. The spring is in the nature of an equalizing member having a tendency to force the collar 10 on its seat at the upper end of the sleeve 3, and also permits of a vertical movement of the post through the fixed sleeve so that injury cannot occur to the head lamps 9 when the vehicle travels over rough surfaces.

Outward of its threaded portion each of the rods 6 is provided with a reduced extension 16 which are received in the socketed ends of links 17 and 18 respectively. Suitable binding means 19 hold the ends 16 of the rod 6 in the sockets.

The link 18 is of a greater length than the link 17, and pivotally secured to the outer end of the link 17 and likewise pivoted approximately centrally to the link 18 there is a cross rod 20. Pivoted to the free end of the link 18 there is a short arm or link 21 which is pivotally connected, as at 22, to a slidable socket member 23 adjustably secured by means 24 on the steering knuckle connecting rod 25 for the front wheels 26 of the vehicle 27.

It is believed that the construction and automatic operation of the improvement will be apparent to those skilled in the art to which this invention relates upon perusal of the specification and an inspection of the accompanying drawing, it being noted that the turning of the steering wheels 26 on their knuckles cause the latter to impart a longitudinal movement to the knuckle connecting rod 24 which, through its link connection 21 with the link 18 will cause the latter to revolve the rod 6 attached thereto, and likewise impart longitudinal movement to the rod 20 to cause the second rod 6 to turn in its sleeve and likewise turn the headlamp connected therewith. The improvement it, of course, not to be restricted to the precise structural details herein set forth as I hold myself entitled to make such changes therefrom as fall within the scope of what I claim without departing from the spirit of the invention.

Having described the invention, I claim:—

The combination with an automobile, the front mud guards therefor, and the brackets for sustaining the mud guards thereon, of sleeves passing through the mud guards, lugs on the sleeves secured to the brackets, each of said sleeves having its bore at its lower end widened, a rod passing through each sleeve having its upper end provided with a threaded bore, a collar surrounding the arm resting on the upper end of the sleeve, binding means between the arm and sleeve, head lamps having their posts provided with threaded extremities which are screwed in the threaded bores of the rods and which are contacted by the binding means between the collar and rods, a spring on each rod received in the widened bore of the sleeve, adjusting means on each rod in contact with the spring, links removably secured to the lower end of each rod, a cross rod pivotally connecting the links, a second link pivotally secured to one of the first mentioned links, arranged angularly thereof, a socket member slidably secured on the steering knuckle connecting rod of the machine, and pivotally connected with said last mentioned link.

In testimony whereof I affix my signature.

WILLIAM J. MORGAN.